United States Patent [19]

Hitz et al.

[11] 4,204,252
[45] May 20, 1980

[54] WRITEABLE CONTROL STORE FOR USE IN A DATA PROCESSING SYSTEM

[75] Inventors: George E. Hitz, Sudbury; Charles H. Kaman, Newton Highlands; Craig Mudge, Weston; James F. O'Loughlin, Westford; Daniel T. Sullivan, Bolton, all of Mass.

[73] Assignee: Digital Equipment Corporation, Maynard, Mass.

[21] Appl. No.: 883,085

[22] Filed: Mar. 3, 1978

[51] Int. Cl.$^2$ .......................... G06F 9/18; G06F 13/00
[52] U.S. Cl. .................................................. 364/200
[58] Field of Search ... 364/200 MS File, 900 MS File

[56] References Cited

U.S. PATENT DOCUMENTS

| 3,766,532 | 10/1973 | Liebel | 364/200 |
|---|---|---|---|
| 4,001,788 | 1/1977 | Patterson | 364/200 |
| 4,027,291 | 5/1977 | Tokura et al. | 364/200 |
| 4,032,895 | 6/1977 | Lanza et al. | 364/200 |
| 4,037,202 | 7/1977 | Terzian | 364/200 |
| 4,048,481 | 9/1977 | Bailey et al. | 364/200 |
| 4,075,687 | 2/1978 | Nissen et al. | 364/200 |
| 4,080,648 | 3/1978 | Asano et al. | 364/200 |

*Primary Examiner*—Mark E. Nusbaum
*Attorney, Agent, or Firm*—Arthur W. Fisher; Thomas C. Siekman; Richard M. Kotulak

[57] ABSTRACT

A writeable control store for storing a plurality of instructions used to control the operation of a processor in a data processing system. The control store may be utilized in a first mode wherein the instructions are accessed for controlling the operation of the processor and in a second mode wherein data is transferred to or retrieved from the control store. In the second mode of operation, a secondary control means is utilized to control the operation of the data transfers to and from the writeable control store.

15 Claims, 6 Drawing Figures

WRITEABLE CONTROL STORE FOR USE IN A DATA PROCESSING SYSTEM

BACKGROUND OF THE INVENTION

1. Field of the Invention

This invention relates generally to data processing systems and more specifically to a writeable control store for use in the processor of a data processing system.

2. Description of the Prior Art

In many data processing systems, and especially in smaller, economical data processing systems, the internal operations of the processor are controlled by the execution of instructions stored in an internal control store. In such systems, these instructions are typically stored in a read only memory (ROM) of a limited storage capacity. These ROMs are typically programmed at the factory and are not alterable in the field.

However, many systems are provided with additional control store capabilities typically in the form of an option which may be programmed in the field for a particular application. These control stores are typically comprised of a random access memory (RAM) which may be loaded or written with data used to control the operation of the processor.

Typically, the loading or writing of such a control store is controlled by either the main control store (ROM) or the extendable or writeable control store itself. Both of these methods are uneconomical and may degrade the performance of the processor by utilizing additional time to complete the actual loading of the writeable control store.

Utilization of the primary control store or ROM to control data transfers to and from the writeable control store requires the use of additional storage locations within the ROM which must be dedicated for this purpose. In a smaller economical system, these additional storage locations may not be available or may require the sacrifice of additional capabilities of the machine. This is a particularly difficult burden because these storage locations may not even be utilized, since the variable control store is typically provided as an option and, may not be used in many cases. Additionally, the length of the instruction required to control the data transfers to and from the writeable control store will typically be substantially less in size than the length of the instruction normally utilized to control the operation of the machine. Thus, by using the primary control store, storage locations for substantially longer words must be used even though the capacity of each is only partially utilized.

Utilization of the writeable control store to control data transfers to and from itself is uneconomical for the same reasons specified above for the primary control store ROM. Additionally, in most systems, this will also degrade the performance of the machine in that at least one additional machine cycle will be required to complete the loading of the WCS unit. Specifically, a machine cycle will be required to access the instruction utilized to control the transfer and an additional machine cycle will be required to actually complete the loading or writing operation.

SUMMARY OF THE INVENTION

The present invention overcomes the aforementioned difficulties with the prior art by providing a writeable control store which can control such data transfers to and from WCS array both economically and in a minimal amount of time.

Specifically, a secondary control store is provided in the writeable control store to control the operation of the processor during such times as data is being transferred to the writeable control store. The secondary control store is programmed with a plurality of instructions grouped together in routines and utilized to control such data transfers. The secondary control store is preferably enabled by one of several instructions stored in the main control store or in the WCS array or RAM store which will address the first instruction in one of the routines stored in the secondary control store and transfer control of the processor to the secondary control store. Upon completion of the execution of the routine, control is returned to the RAM in the writeable control store.

The capacity of the storage locations of the secondary control store of the present invention may be substantially smaller, with respect to the number of bits per storage location, than the primary control store (ROM) or the RAM in the writeable control store. The number of storage locations in the primary control store required in the prior art techniques for enabling the transfer of data to and from the writeable control store is substantially reduced by use of the present invention. Additionally, the execution time of any instruction requiring a transfer to the writeable control store under the control of the secondary control store means can be performed at normal machine cycle rate. Thus, additional machine cycles will not be required to complete the loading of storage locations in the writeable control store.

Additionally, use of the present invention in conjunction with a writeable control store permits the writeable control store to be economically used as both a control store and an extension or local store for data without degrading the performance of the processor.

BRIEF DESCRIPTION OF THE DRAWINGS

FIG. 2b is a timing diagram depicting the sequence of clock pulses generated by the clock circuit of FIG. 2a.

CROSS REFERENCES TO RELATED PATENTS AND APPLICATIONS

The following U.S. Patents and U.S. Patent Applications, all of which are assigned to the assignee of the present application are hereby incorporated by reference: U.S. Pat. No. 3,710,324 entitled "Data Processing System" in the name of John B. Cohen, et al; U.S. Pat. No. 3,614,740 entitled "Data Processing System with Circuits for Transferring Between Operating Routines, Interruption Routines, and Sub-Routines" in the names of Bruce A. Delagi, et al; U.S. Pat. No. 3,614,741 entitled "Data Processing System with Instruction Addresses Identifying One of a Plurality of Registers including the Program Counter" in the names of Harold L. McFarland, Jr., et al; and co-pending application Ser. No. 776,331 entitled "An Processor for a Data Processing System" in the names of Charles H. Kaman, et al.

DESCRIPTION OF THE PREFERRED EMBODIMENT

Figure 1:
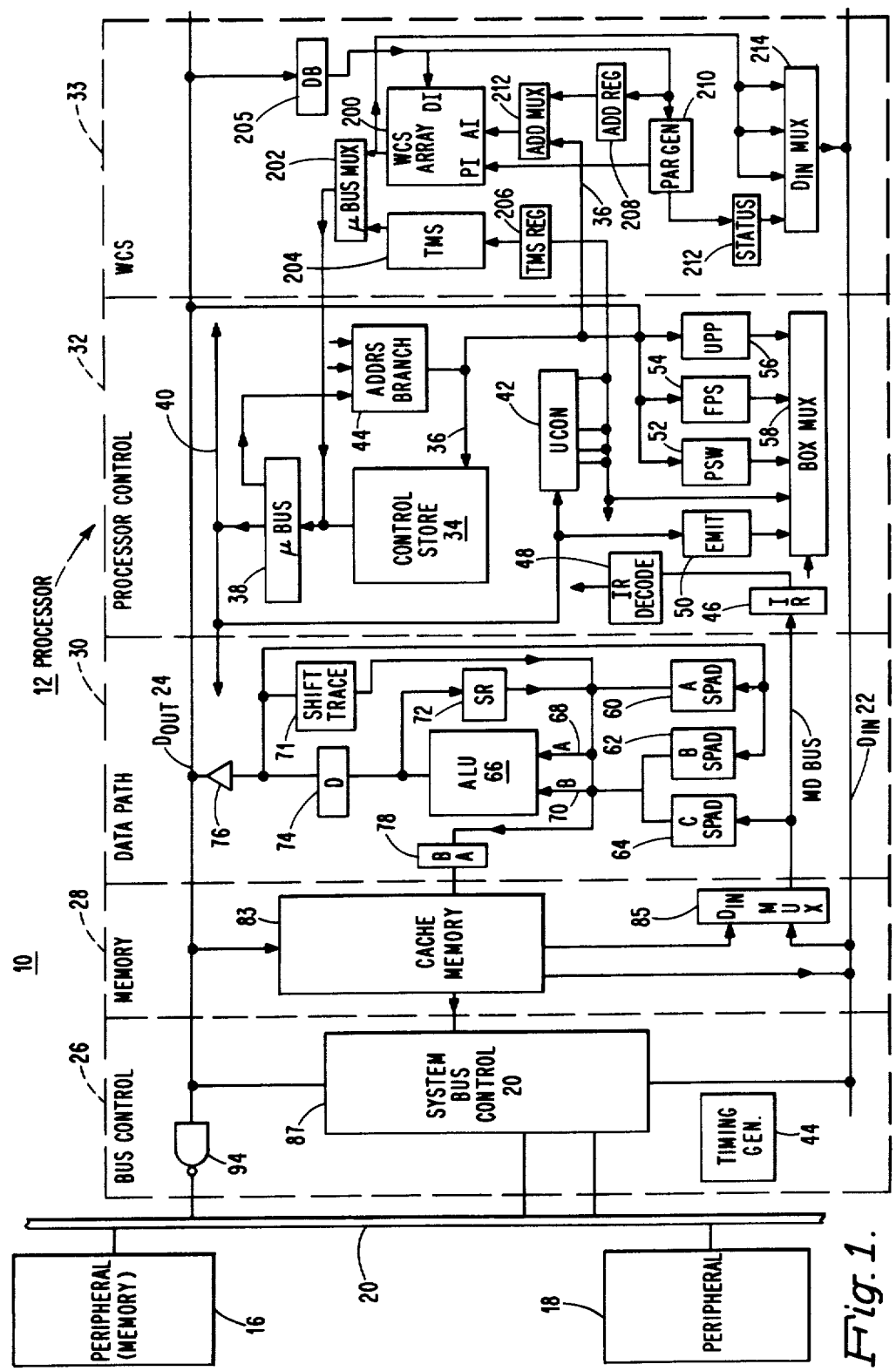
FIG. 1 is a block-schematic diagram of a data processing system depicting, in particular, a processor incorporating the present invention.

Referring to FIG. 1, a block-schematic diagram of a data processing system 10 is shown which includes a processor 12 that incorporates the present invention. In addition to the processor 12, the data processing system 10 includes a memory 16 and at least one peripheral device, such as peripheral device 18, each of which is interconnected by a data bus 20. The data bus 20 couples all address, data and control information between the processor, the memory and the peripheral devices.

The processor 12 is comprised of a number of units, each of which is connected between a Din bus 22 and Dout bus 24. The processor units, some of which will be described in greater detail hereinafter, include a bus control unit 26, for controlling the use of the data bus 20, a processor memory unit 28 for storing data therein for quick retrieval by the processor 12, a data path unit 30 for performing arithmetic and manipulative operations on data, and a processor control unit 32 for storing previously programmed instructions for controlling the operation of the processor and utilized to fetch, interpret and execute the external instructions typically stored in the memory device 16. The processor 12 also includes additional or optional units such as a floating point processor unit (not shown) or a writeable control store unit (WCS) 33 for storing additional instructions which may be used to control the operation of the processor. Additionally, it should also be noted and understood at this point that the configuration in FIG. 1 is exemplary and that other configurations may be utilized which incorporate the present invention.

Still referring to FIG. 1, and, in particular, to the processor control unit 32, a control store 34, typically a ROM (read-only-memory), is shown therein which is preprogrammed with a plurality of processor instructions or microwords (hereinafter referred to as $\mu$-words) which are used to control the processor 12 for specific intervals of time. In the preferred embodiment shown in FIG. 1, the $\mu$-word is comprised of a multiple binary bit word which is divided into a number of fields. The interpretation of the various fields by the processor 12 dictates what action will take place therein.

Each $\mu$-word is stored within the control store 34 at an addressable location. The address of the desired $\mu$-word is placed on the next $\mu$-word address bus (NUA) 36 and at the beginning of the next processor timing cycle or microcycle (hereafter $\mu$-cycle) the contents of that location are read from the control store 34 and loaded into the microbus register 38.

Figure 2A:
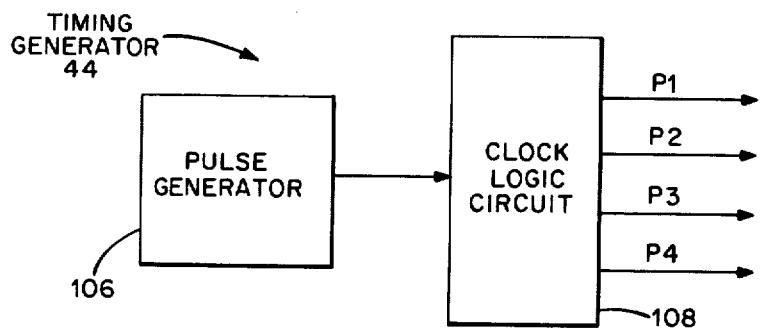
FIG. 2a is a block diagram depicting a clock circuit used to generate clock pulses for use by the processor in FIG. 1.
Figure 2B:
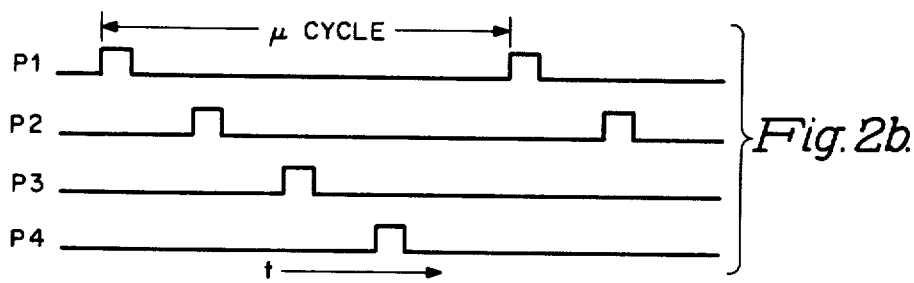

At this point, a brief mention of the processor timing should be made since timing is a critical part of any data processing system. Referring to FIG. 2a, a timing generator 44, which in the embodiment of the processor 12 depicted in FIG. 1 is located within the bus control unit 26, is comprised of a pulse generator 106 coupled to a clock logic circuit 108. The pulse generator 106 produces a uniform series of electrical signals. The clock logic circuit in turn generates, in response to these signals, the sequential pulse streams (P1, P2, P3 and P4) depicted in FIG. 2b.

At the beginning of each $\mu$-cycle, a pulse P1 is coupled to the control store 34 which causes the contents at the address indicated on the NUA bus 36 to be read and loaded into the microbus register 38. The $\mu$-cycle, which is defined for the purposes of the processor 12 utilized in the preferred embodiment, as the time between successive loadings of the register 38 (i.e. between successive P1 clock pulses), may range from nanoseconds to microseconds depending upon the performance characteristics of the machine. The remaining pulses (P2, P3 and P4) in each $\mu$-cycle are used to control the timing of events which the $\mu$-word has specified, such as, for example, loading of registers, transfer of information performing arithmetic operations in the data path 30, etc.

Referring again to FIG. 1, the contents of register 38 are coupled throughout the processor 12 via the $\mu$-word bus 40 for interpretation and implementation by the processor 12. Various portions or fields of the $\mu$-word are coupled to a microcontrol (UCON) register 42 and the address and branching circuit 44.

As previously indicated the $\mu$-word is comprised of numerous binary bits which are grouped into fields for the purposes of interpretation by the processor 12. For example, a group of bits referred to as the micropointer field (UPF), contains the address of the next $\mu$-word to be addressed in the control store 34 since the processor 12 in FIG. 1 utilizes the technique of addressing the next $\mu$-word for execution commonly referred to as chained-sequencing addressing.

The $\mu$-word also contains a 6-bit field called the micro branching field (UBF) which designates branch tests to be performed within the processor 12 during a $\mu$-cycle. Both the UPF and the UBR fields are coupled to the address and branching circuit 44. Branch tests are utilized to alter the address of the next $\mu$-word if certain conditions, specified by the branch field (UBF), exist. The contents of certain bit locations in designated registers throughout the processor 12 which have particular significance with respect to the state of the processor are coupled to a logic circuit (not shown), typically a multiplexor, in the address and branching circuit 44. The UBF field, which is coupled to this logic circuit, selects certain of these information bits for logical combination, typically ORing, with the low order bits of the UPF field. If the conditions tested for by the UPF field are present, the UPF field is altered in response thereto, and the result is coupled to the NUA bus 36 for selecting the next $\mu$-word.

Several other fields are also included in the $\mu$-word. These include a clock field which designates which of certain devices are to be clocked and at what point in the $\mu$-cycle they are to be clocked at; a bus control field, which indicates whether or not a transfer of data or control information is to be performed between units in the processor 12 or between the processor 12 and a peripheral device connected to the data bus 20; and a data path function field which controls the operation of the data path 30.

Some of the fields in the $\mu$-word, for example, the data path function field, will be interpreted differently depending on the processor operation specified by the μ-word. More particularly, if the function specified by the μ-word does not involve a data path operation, then the data path function field may be used for other purposes.

Several other registers and circuits are also contained in the processor control unit 32 depicted in FIG. 1. These include an instruction register (IR) 46, which is used to receive and store general or main instructions fetched by the processor unit 12 from the data path 30, typically originating in the memory 16 or peripheral 18 for interpretation and execution. Coupled to the IR 46 is an instruction register decode circuit 48 which decodes the contents of IR 46. The output of the decode circuit 48 is coupled to the address and branching circuit 44 such that the UPF field is altered if necessary and the appropriate program starting address is coupled to the NUA bus 36.

Four general purpose registers, the emit register 50, the processor status word register (PSW) 52, the floating point status register (FPS) 54, and the program micropointer (UPP) register 56, are used, under the control of the UCON register 42, to store certain information during the execution of programs by the processor 12. For example, the emit register 50 is used to store an entire field in the μ-word which may be used as data by the data path 30 at a later time. The bits comprising this field are situated in the same location within the μ-word that would ordinarily comprise the datapath function field because a datapath function will not be specified in such a μ-word. The PSW register 52 is used to perform the same function as the Status Register 59 described in aforementioned U.S. Pat. No. 3,710,324. This register contains such information as the present mode of operation of the processing unit, the previous mode of operation, the priority level at which the processor is operating, and the condition codes, all of which are described in U.S. Pat. No. 3,710,324.

The FPS register 54 is utilized to store status information similar to the PSW register 52 when an optional floating point processor is coupled to the processor unit 12, and the UPp register 56 is utilized to track the μ-word so that, if microroutine is interrupted, the address of the last μ-word before the interruption will be stored therein.

Lastly, the processor control unit 32 in FIG. 1 includes a box multiplexor circuit 58 which is utilized under the control of the UCON register 42 to selectively couple the contents of one of the four status registers, 50, 52, 54 and 56, to the Din Bus 22. This device, along with the other box multiplexors disposed in the other units of the processor 12, will be described in greater detail hereinafter.

The data path unit 30 contains various holding registers, storage locations, logic circuitry and an arithmetic logic unit (ALU) which are used to perform the data manipulations within the processor 12. I particular, the data path 30 shown in FIG. 1 contains three scratch pads, 60, 62 and 64. The A & B scratch pads, 60 and 62, are general purpose scratch pads and are the primary storage location for data which will be used by the data path 30 in the execution of a program. The C scratch pad, 64, is a special purpose scratch pad which is used by the data path 30 to store error log information, constants often used by the data path in its operation and to initially store all data coupled into the data path 30. More specifically, a special register, MD, within the C scratch pad 64 is loaded via the Din multiplexor 85 with any data or control information coupled on to the Din bus 22 except general instructions.

The A and B scratch pads, 60 and 62, have certain storage locations therein reserved for the general purpose registers described in U.S. Pat. No. 3,710,324. For example, these include a program counter register, which is sequencially incremented to indicate the address of the next general or special instruction which the processor 12 will fetch, interpret and execute and a stack pointer register which points to an address in a section of memory reserved as stacks and where the contents of the program counter register and the FPS Register 52 for various microroutines in the processor control unit 32 may be stored for later reference when the processor 12 is interrupted, for example, by an external peripheral device requesting service therefrom.

The ALU 66, which performs the arithmetic and logical data manipulations in the processor 12 has two inputs thereto, an A input 68 and a B input 70. The A input 68 has coupled thereto the outputs from the A scratch pad registers 60, the shift tree 71, and a shift register 72. Coupled to the B input 70 are the outputs from the B scratch pad registers 62 and the C scratch pad registers 64. The ALU 66 performs the operations specified by the μ-word on the data which is coupled to it on the A and B inputs 68 and 70, respectively. These operations include adding, subtracting, ANDing, ORing, incrementing, decrementing, etc.

The D Register 74 and the shift register 72 are holding registers which are coupled to the output of the ALU 66. The D register 74 may be written with the output of the ALU 66 and/or read from during any μ-cycle. The contents of the D register may be directed to a number of locations by the μ-word, such as other locations in the data path 30, other units in the processor 12, and external peripheral devices coupled to the data bus 20. The shift register 72 is a register into which the output from the ALU 66 may be stored and shifted one bit to the left or right. Additionally, the shift register may be used for other functions, such as a temporary holding register which may be used to provide data to the A input of the ALU 66 in subsequent operations.

The shift tree 71 performs various operations on the data store in the D-register 74 such as a single bit shift to the left, a multiple bit shift to the right, sign extensions and byte swaps. Unlike, the shift register 72 and the D register 74, the shift tree 71 is a combinational logic element which does not hold its output across subsequent μ-cycles. Thus, the output of the shift tree 71 must be operated on by the ALU 66 in the same μ-cycle that the output from the D-register 74 is modified.

The remaining elements of the data path unit 30 shown in FIG. 1 are a logic gate 76 through which the contents of the D register are coupled to the Dout bus 24, and a bus address register 78 coupled to the A input 68 of the ALU 66 and into which the address of a location is loaded to or from which data and/or control information will be transferred. This address may include the address of any location within a peripheral device connected to the data bus 20 or to a location within the memory unit 28.

As previously indicated, the data path function field of the μ-word controls the operation of the data path 30. In particular, this field indicates the location within the scratch pads which will be coupled to the ALU 66, the function which the ALU 66 or the shift tree 71, if any, will perform and the disposition of the resulting product from the ALU 66. An additional field in the μ-word will control the loading, if any, of the contents of the D register into a register in the A or B scratch pads. The μ-word also controls the loading of the bus address register 78 and any shifting operations performed by the shift register 72.

The principal data buses within the processor unit 12, Din 22 and Dout 24, which interconnect the various units within the processor should be discussed briefly at this time. In particular, the Dout bus 24 is the bus over which the contents of the D register 74 are coupled to any unit within the processor 12 or to the data bus 20 for coupling to a memory or peripheral unit. Thus, the D register 74 is the source of all information which is coupled onto the Dout bus 24.

The Din bus 22 is used to couple data and control information to the datapath unit 30. All data appearing on the Din bus are coupled to a general storage register MD within the C scratch pad of the data path unit 30 except for general instructions which, as earlier noted, are coupled to IR 46. Thus, with the exception of general instructions, the data path unit 30 is the destination of all information coupled on to the Din bus 22 in the preferred embodiment shown in FIG. 1.

The memory buffer unit 28 which includes a cache memory 83 used to store data for quick retrieval by the processor 13 and the bus control unit 26, which is utilized for controlling transfers of the data bus 20 are described in greater detail in applicants copending application Ser. No. 776,331.

Figure 3:
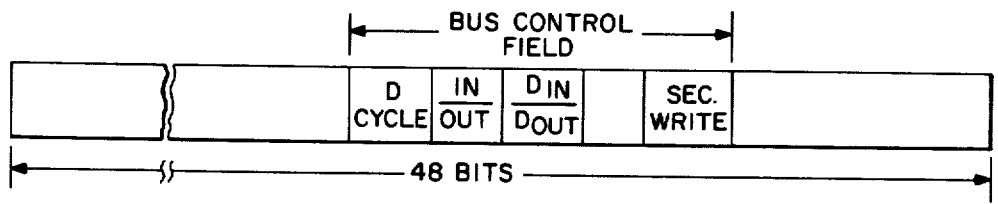
FIG. 3 is a representative illustration of the bus control field of information contained in each processor instruction for controlling transfers of data over the internal data busses of the processor in FIG. 1.

Referring to FIG. 3, a segment or field of the μ-word, the bus control field, is illustrated which is used to control the transfer of information over the Din bus 22 and the Dout bus 24. In particular, a D-cycle bit distinguishes between a μ-word which requires use of the Din or Dout busses as opposed to one that does not. Thus, for example, a binary one in the D-cycle bit indicates that a transfer over one of these two busses is required whereas a binary zero in this bit indicates that these busses will not be used during the μ-cycle. The IN/OUT bit of the bus control field is utilized by the processor 12 in conjunction with the D-cycle bit to distinguish between internal and external operations over the Din and Dout buses. For example, when the D cycle bit is a binary one and the IN/OUT bit also has a value of binary one, then the μ-word has specified an operation over the Din or Dout busses which is internal with respect to the processor 12. However, a value of binary zero in the IN/OUT bit in conjunction with a value of binary one in the D-cycle bit indicates a transfer over the Din or Dout busses between the data path unit 30 and an external memory or peripheral device coupled to the data bus 20. The remaining bits of the bus control field are utilized to supply additional information for controlling the Din and Dout busses such as, for example, designating between the Din and Dout busses for the transfer of information.

Figure 4:
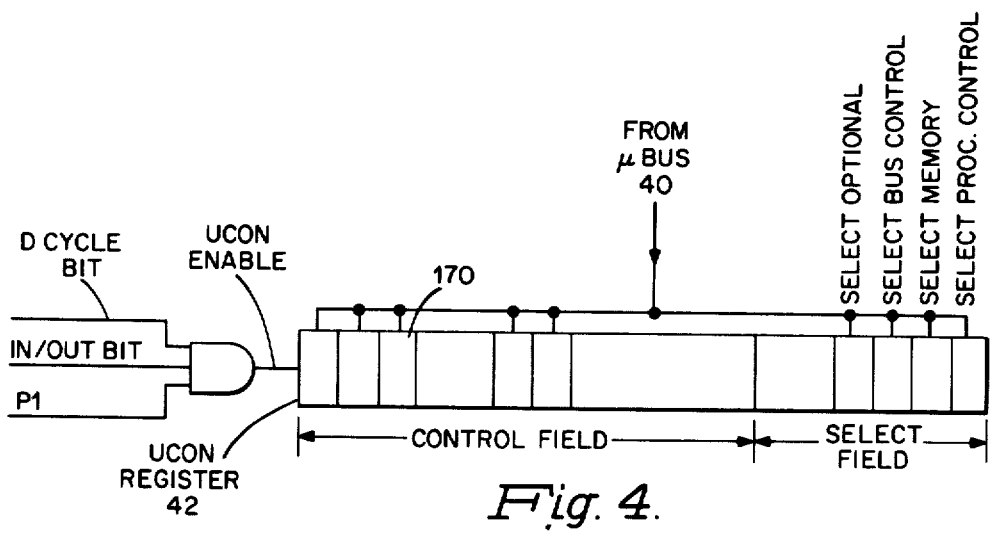
FIG. 4 is an illustration of a control store register utilized to control the selection of storage devices within the units of the processor in FIG. 1 for data transfers over the data busses of the processor in FIG. 1.

If the μ-word defines an internal processor transfer over the Din or Dout bus (ie, the D-cycle and the IN/OUT bits both have a value of binary one), control information in the μ-word relating to the interunit transfer is stored in the UCON register 42. Specifically, as shown in FIG. 4, the loading of the UCON register 42 is controlled by an AND gate 150 having inputs coupled to the D-cycle bit and IN/OUT bit of the μ-word. The portion of the μ-word typically reserved for the data path function field is used as the data source for the UCON register 42 since a data path operation will not take place in this μ-word.

The UCON register 42 stores a plurality of bits which are divided into two fields; the select field and the control field. The select field is used to designate which unit in the processor will communicate with the data path 30. Thus, the number of bits comprising the select field is determined by the number of units within the processor unit 12. More particularly, the number of bits in the select field is at least equal to the number of units coupled to the processor unit 12 in addition to the data path 30. In the processor 12 depicted in FIG. 1 only one unit is permitted to communicate with the data path 30 at one time. Thus, only one bit within the select field of the UCON register 42 may have a value of binary one at any one time, where a binary one is the value used to select such a unit. It should be noted, however, that with the addition of appropriate logic circuitry and/or μ-word bits more than one unit could be selected in the select field of the UCON 42 at one time.

The control field of the information stored in the UCON 42 is used in conjunction with the select field to provide additional control information necessary to select a particular device, such as a register, for communication with the data path unit 30. Referring again to FIG. 1, and, in particular to the processor control unit 32, it can be seen that the devices which communicate with the data path 30 over the Din bus 22 are coupled thereto through a multiplexor such as multiplexor 38. Although not shown in FIG. 1, each unit may have more than one multiplexor and each multiplexor may have several registers or other storage devices coupled to the inputs thereof. Thus, the control field of the data stored in the UCON register 42 is used (in continuation with logic circuitry not shown) to select the multiplexor and the register or other storage device within the selected unit for communication with the data path 30. Since the control field of the UCON register is decoded in conjunction with the select field and only one unit is selected at any one time, the same bits within the control field may be utilized for selection of the various registers and storage devices within all of the units of each unit within the processor 12.

Still referring to FIG. 1, the writeable control store unit 33 (hereafter WCS) includes a WCS array 200 which is typically comprised of a plurality of addressable random-access memory storage locations which may be loaded with μ-words utilized to control the operation of the processor 12. The output of the WCS array 200 is coupled to a microbus multiplexor 202 having an output coupled to the input of the microbus register 38 in the processor control unit 32. The microbus multiplexor 202 is utilized to select between one of two sources of μ-words in the WCS unit 33 for coupling through the microbus register 38 to the microbus 40 when the WCS unit 33 is in control of the operation of the processor 12. In addition to the output of the WCS array 200, the output of a secondary control store or transfer micro control store 204 (hereafter TMS) is also coupled to an input of the microbus multiplexor 202. The TMS 204 is utilized to store μ-words, smaller in length than those stored in the WCS array 200 and the control store 34, for controlling the operation of the processor 12 while data is being transferred to or from the WCS array 200. Coupled to the input of the TMS 204 is the output of a TMS micropointer register 206 which is utilized to address the storage locations within the TMS 204 during such times as the TMS 204 is in control of the operation of the processor 12. The TMS micropointer register 206, as shown in FIG. 1, is initially loaded by the UCON register 42.

Also included in the WCS unit 33 is a data buffer latch 205 having an input coupled to the Dout bus 24 and an output coupled to the data input of the WCS array 200, the input of an address register 208 and the input of a parity generator circuit 210. The data buffer latch 205 is thus used to initially receive and store data transmitted to the WCS unit 33 from the data path unit 30 via the Dout bus 24.

The output of the address register 208 is coupled to an input of an array address multiplexor 212. The address register 208 is utilized in the WCS unit 33 to address storage locations within the WCS array 200 during such times when the TMS 204 is controlling the operation of the processor 12. The array address multiplexor 212, having an output coupled to the address inputs of the WCS array 200, is utilized to select an input to the WCS array 200 from either the address register 208 or the NUA bus 36. Accordingly, during normal operation of the WCS unit 33, the address information for the WCS array is obtained from the NUA bus 36 and during such times when the TMS 204 is controlling the processor 12, such address information is obtained from the address register 208.

The output of the data buffer latch 205 is also coupled to a parity generator 210 which is used to generate a parity bit for each 16 bit word of data which is loaded into the WCS array 200. The output of the parity generator is also coupled to a status register 212 which is utilized to store status information regarding the operation of the WCS unit 33 in addition to the parity information for use by the processor 12. The output of the status register is coupled to an input of a Din multiplexor 214 which is utilized to select between a number of inputs for coupling to the MD register in the C scratch pads 64 within the data path unit 30 via the Din bus 22. In addition to an output from the status register 212, the inputs to the Din multiplexor 214 are also coupled to outputs of the WCS array 200 so that one of three 16 bit data fields coupled to the output of the WCS array 200 may be transmitted to the MD register as will be specified in greater detail hereinafter.

The micro-pointer field (UPF) in each $\mu$-word, as earlier explained, is utilized to address the next $\mu$-word to be accessed by the processor 12 during the execution of any microroutine or microprogram. Since microroutines will, for the most part, be contained within a 512-word group or page, the UPF field need only be large enough to address the number of storage locations in a page which in the case of the preferred embodiment is 9 bits. To complete the address, an extra 3 bits, which define which 512-word page will be accessed, is required. In the processor control unit 32 of the preferred embodiment of the present invention, this is accomplished by incorporating a page register (not shown) which is utilized to store 3 bits comprising the page address. Each time a $\mu$-word is addressed, the contents of the UPF field are combined with the contents of the page register to form the complete address.

In order to load the page register, one of several $\mu$-words must be addressed which will automatically load a particular field therein into the page register. Since a change in the page field occurs relatively infrequently during the execution of a program, the performance of the processor 12, in terms of extra $\mu$-cycles consumed to change pages by the utilization of this technique is not materially affected and a significant savings (3 bits) in the UPF field of each $\mu$-word is realized.

As noted above, the page field stored in the page register, which is added to the UPF field in the $\mu$-word to address the next $\mu$-word in a microroutine, is comprised of three binary bits. In the processor control unit 32 of the embodiment in FIG. 1, the control store 34 is comprised of 3,072 storage locations or 6 512 $\mu$-word pages. Since only six of the possible eight binary combinations in the page field are required to address the six pages in the control store 34, the remaining two binary combinations may be used to address the WCS array 200. Thus, in the embodiment of the processor 12 depicted in FIG. 1, the last two page addresses (110 and 111) are used to address the WCS array 200.

Figure 5:
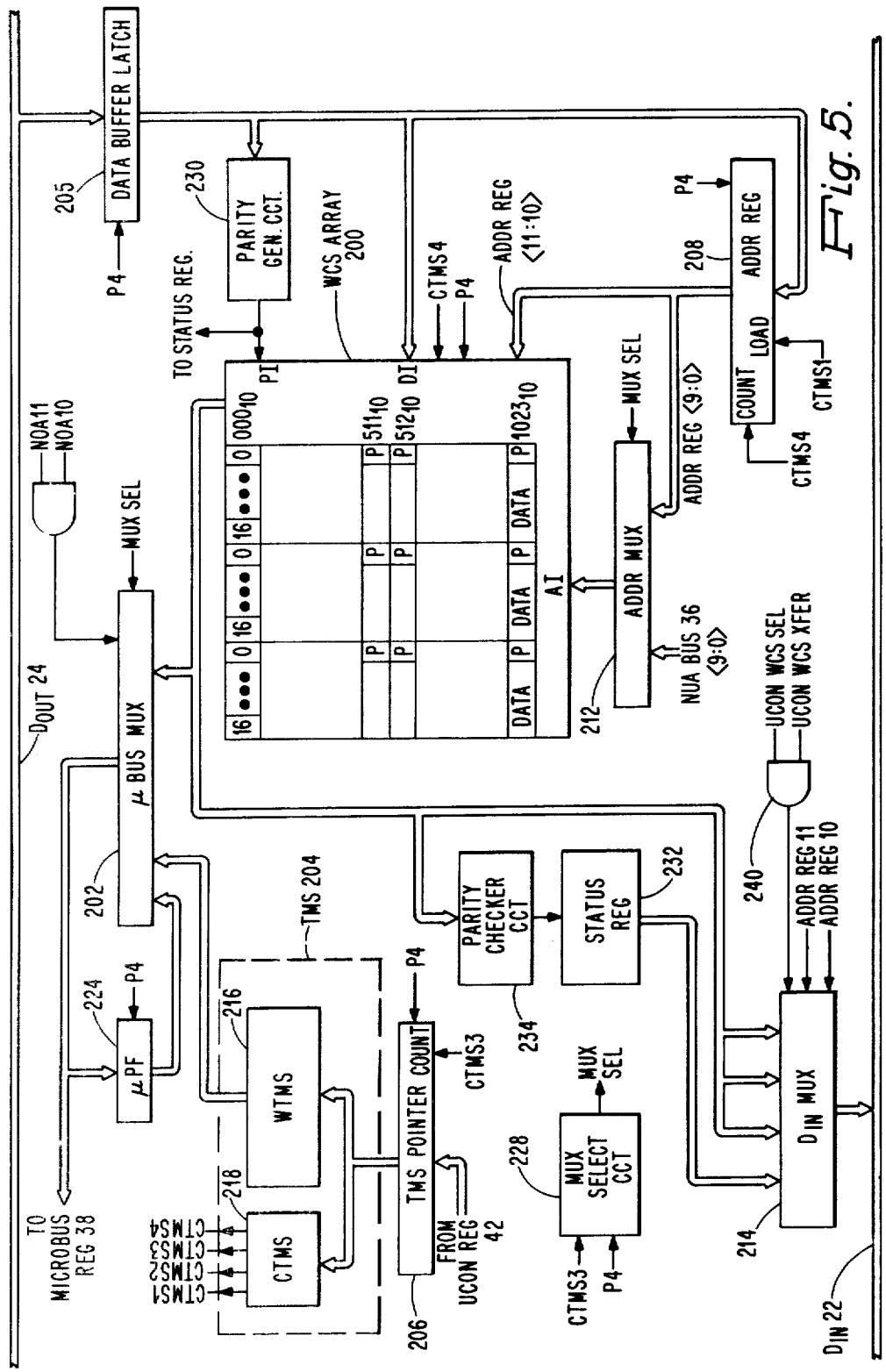
FIG. 5 is a block diagram of a writeable control store unit in the processor of FIG. 1 depicting, in particular, the present invention for controlling data transfers to the control store device of the writeable control store unit.

The WCS array 200, depicted in greater detail in FIG. 5, is comprised of 1,024 48-bit storage locations which are grouped into two 512 $\mu$-word pages. More specifically, the WCS array 200 shown in FIG. 5 is, for the purposes of the preferred embodiment of the present invention, comprised of three, separately addressable, 1,024×17 bit random-access-memories (RAMs) wherein each such 17 bit addressable storage location is comprised of 16 bits for data storage and a single bit for parity storage. The three 1024×17 bit RAMs are then arranged in the WCS unit 33 to form the 1,024×48 bit (excluding parity bits) storage locations referred to above.

In order, then, to initially address a 48-bit storage location within the WCS array 200 to retrieve a $\mu$-word therein for controlling the operation of the processor 12 during a $\mu$-cycle, a $\mu$-word must first be retrieved from the control store 34 which changes the contents of the page register such that the two most significant bits therein have a value of binary 1. Thereafter, the contents of the page register in combination with the UPF field of the $\mu$-word on the NUA bus 36 will address storage locations in the WCS array 200 through the address multiplexor 212. The $\mu$-word stored in the addressed storage location in the WCS array is then coupled to the output of the WCS array 200, through the microbus multiplexor 202 and into the microbus register 38 located in the processor control unit 32.

As shown in FIG. 5, the microbus multiplexor 202 is enabled by a gate having inputs coupled to the conductors in the NUA bus 36 which transmit the two most significant bits in the $\mu$-word address. As can be appreciated from the discussion above, the value of the two most significant bits in the page register (which are coupled to the conductors in the NUA bus which transmit the two most significant bits of the $\mu$-word address) will both have a value of binary one when the WCS array 200 is to be addressed. Moreover, the address multiplexor 212 and the microbus multiplexor 202 are both arranged so that the inputs coupled to the NUA bus 36 and the output of the WCS array 200 respectively, are both normally selected. When the TMS 204 is controlling the operation of the processor 12, it will cause a signal to be generated which will select the other inputs to the address multiplexor 212 and the microbus multiplexor 202 as will be described in greater detail hereinafter.

The TMS 204, as earlier noted, is used to control the operation of the processor 12 during those periods of time when data is loaded or written into the WCS array 200. Utilization of the control store 34 for this purpose is uneconomical since the extra storage locations in the control store 34 required for the μ-words to control such operations may not be available so that other capabilities of the processor 12 would have to be sacrificed. Moreover, if the writeable control store unit is provided on an optional basis, these storage locations dedicated for control of transfer operations into the writeable control store, would be wasted every time a processor is furnished without such a writeable control store. Additionally, a substantially shorter μ-word, typically not more than 16 bits, is usually all that is required to control such operations. Thus, for example, use of 48-bit storage locations to store such μ-words in the control store 34 means that two-thirds of the bit storage capacity in each such storage location would be unused or used in a substantially less efficient manner.

Another technique for controlling the loading or writing operation into a writeable control store unit such as WCS Unit 33 is to use the control store (i.e. the WCS array 200) in the WCS unit itself. However, because of timing constraints within the processor, typically, at least one extra μ-cycle will be required to complete such a writing operation. If the writeable control store unit is to be loaded frequently, this extra time consumed may degrade the performance of the processor. This problem is compounded by the fact that, in most smaller processors such as the processor 12 in the preferred embodiment, data words transmitted throughout the processor are typically substantially smaller in length or number of bits than the μ-words stored within the control store 34 or the writeable control store unit. Thus, for example, in the processor 12 data words transmitted over the Din and Dout busses are comprised of 16 binary bits whereas control words in the control stores are comprised of 48 binary bits. It can be appreciated then, that several writing or loading operations (i.e., three, in the case of the WCS unit 33 in the preferred embodiment) are required to completely load a 48 bit μ-word storage location in the control store, such as WCS array 200, in a writeable control store unit, thereby consuming a considerable amount of extra time in the writing or loading of a microroutine(s) into the WCS unit 33. Additionally, for the same reasons described above in the case of the control store 34, a substantial amount of bit storage capacity in each μ-word storage location in the WCS unit 33 will be un-used.

The present invention, then, includes apparatus which may be disposed in a writeable control store unit or elsewhere in the processor and which economically and without degrading the performance of the machine can be utilized to control the writing or loading of data into the writeable control store unit. The present invention can also be used to perform other functions such as, for example, to control transfers of the data to and from a portion of the control store in the writeable control utilized as a local store so that, for example, words of data may be stored therein and retrieved therefrom. This capability could be used, for example, in the processor 12 of the preferred embodiment to move a block of data words to and/or from the scratch pad registers in the data path unit 30.

In the preferred embodiment of the present invention, the TMS 204 is utilized to store the μ-words which control the operation of the processor 12 during such times as the WCS array 200 is being loaded with data or being utilized, as mentioned above, as a local store. Referring again to FIG. 5, the TMS 204 is shown in greater detail. In particular, the TMS 204 is shown as being comprised of two storage units, the WTMS store 216 and the CTMS store 218. In the preferred embodiment of the present invention, the WTMS store 216 is comprised of a read-only-memory (ROM) having 512, separately addressable 16-bit storage locations. The CTMS store 218, on the other hand, is comprised of a ROM having 512, separately addressable, 4-bit storage locations. Moreover, the WTMS store 216 and the CTMS store 218 are arranged so that both are addressed by the same address conductors 220 such that, if, for example, the fifth storage location is addressed in the WTMS store 216, the fifth storage location in the CTMS store 218 will also be addressed.

The WTMS store 216 is utilized to store 16 bit μ-words which will be utilized to control the operation of the processor 12 during such times as the WCS array is being loaded or being used as a local store. As shown in FIG. 5, the output of the WTMS store 216 is coupled to the microbus multiplexor 202 so that μ-words addressed and accessed thereon can be coupled to the μ-word bus 40 via the microbus multiplexor 202 and the microbus register 38. The 16-bit μ-words stored within the WTMS store 216 are arranged in microroutines to perform specific functions and the starting address of each routine is stored in a section within the WCS array 200 hereafter referred to as TMS residence section.

The CTMS store 218 is utilized to store control information utilized within the WCS unit 33 when the TMS store 204 is in control of the processor 12 but which is not a part of the μ-word coupled through the microbus multiplexor 202 to the microbus register 38. Each time a μ-word in the WTMS store 216 is accessed, a 4-bit word in the CTMS store 218 will also be accessed. The function of each bit in these 4-bit μ-words will be described in greater detail hereinafter.

In operation, control is transferred to the TMS 204 in the following manner. A microroutine in the WCS array 200 which is being executed will be arranged to set up the processor 12 so that the TMS 204 can assume control. Specifically, under the control of a μ-word stored in the WCS array 200, a starting address for the loading or transfer operation into or out of the WCS array 200 is loaded into the D register 74 in the data path unit 30. Typically, this address will be stored in one of the general purpose registers in the A and B scratch pad registers 60 and 62. The μ-words issued from the WCS array 200, as earlier explained, are coupled through the microbus multiplexor 202 into the microbus register 38 and via microbus 40,' throughout the processor 12 to control the operation thereof.

The UPF field of this μ-word specifies an address in the TMS residence section of the WCS 200 array. In the next μ-cycle, the μ-word stored in this location in the TMS residence section of the WCS array 20 will be coupled through the microbus multiplexor 202 and into the microbus register 38. Additionally a portion of the data field in such a μ-word will be loaded into the UCON register 42 located in the processor control unit 32 in the same μ-cycle in the manner illustrated in FIG. 4. In the subsequent μ-cycle, the contents of the UCON register 42 which include the starting address of the microroutine in the TMS 204 are transferred into the TMS pointer register 206. Also, during this μ-cycle, the contents of the D register 74 which represents the starting address in the WCS array 200 are transferred via the Dout bus 24 to the data buffer latch 205. Additionally, one more μ-word is issued from the WCS array 200 to permit sufficient time for the starting address in the WTMS and CTMS stores, 216 and 218 respectively, specified by the contents of the TMS pointer register 206 to be accessed. This μ-word is defined as a no-operation (no-op) instruction during which no processor activity takes place other than accessing of the starting address in the WTMS and CTMS store 216, 218 respectively. This μ-word, however, does contain a UPF field which will be used as a return address in the WCS array 200 upon conclusion of the TMS microroutine. Thus, at the end of the μ-cycle, and more specifically, when the P3 clock pulse is raised, the contents of this UPF field will be stored in a micropointer storage register 224 under the control of the no-op μ-word.

As earlier noted, the CTMS store 218 is used to store 4-bit μ-words which are utilized in conjunction with the μ-words stored in the WTMS store 216 to control the internal operation of the WCS unit 33 during such time when the TMS/204 controls the operation of the processor 12. The first bit position in each μ-word stored in the CTMS store 218 is utilized to load the address register 208 when, for example, the value of the first bit position is a binary 1. The second bit position therein is used to advance the count in the address register 208 when the value of this bit position is a binary 1. At this point, it should be noted that both the address register 208 and the TMS pointer register 206 are counters which may be advanced under the control of a bit in the CTMS μ-word. Specifically, the WCS array 200 address stored in the address register 208 may be advanced by increments of one under the control of the second bit in the CTMS μ-word at the end (i.e. during the clock pulse P4) in each μ-cycle so that successive storage locations within the WCS array 200 may be addressed for reading, or writing purposes as will be more fully described hereinafter.

Similarly, the TMS pointer register 206 is used to advance the processor 12 through a TMS microroutine by incrementing by one the TMS address stored in the TMS pointer register 206 at the end (i.e. during the clock pulse) of each μ-cycle. In this case, the third bit position of the CTMS μ-word is used to increment the address in the TMS pointer register 206. The third bit position in each CTMS μ-word is also coupled to a MUX select generator circuit 228 which generates select signals, in response to a binary 1 in such third bit position, which are coupled to the address multiplexor 212 and the microbus multiplexor 202 to select the input from the address register 208 and the WTMS store 216, respectively, during such times as the TMS 204 is in control of the processor 12.

The fourth and final bit position of each μ-word stored in the CTMS store 218 is coupled to the WCS array 200 as a write signal for loading or writing data into the WCS array 200. Thus, for example, a value of binary one in this bit location will cause, when the P4 clock pulse signal is raised, the contents of the data buffer latch 205 to be written into the address in the WCS arrary 200 specified at the output of the address multiplexor 212.

Returning now to the example mentioned above, the next μ-word addressed in the TMS 204 will access a CTMS store μ-word in which the first and third bit positions have a value of binary one. This will cause the contents of the data buffer latch 205 which now contains the starting address in the WCS array 200, to be loaded into the address register 208 and will advance the count in the TMS pointer register 206 so that the next consecutive address in the TMS 204 will be addressed in the subsequent μ-cycle. In the subsequent μ-cycle, a μ-word will be accessed in the WTMS store μ-cycle and the CTMS store which will cause the contents of the address register 208 to be coupled into the address multiplexor 212 since the third bit position in this μ-word addressed in the CTMS store 218 will have a value of binary one. During this μ-cycle, if data is to be written into the WCS array 200, the μ-word retrieved from the WTMS store 216 will cause the data contained in the D register 74 in the processor control unit 32 to be transmitted via the Dout bus 24 into the data buffer latch 205.

As earlier noted, the TMS store 204 may be utilized to control the loading of data into the WCS array 200 to form 48 bit μ-words which can be used during normal WCS operation to control the operation of the processor 12. The TMS 204 may also be utilized to load data in a portion of the WCS array reserved as a local store which may be utilized by the processor at a later time. Under the control of the TMS 204, data may also be retrieved from the WCS and coupled onto the Din bus 22 through the Din multiplexor 214 for transmission to the data path unit 30.

If then, for example, it is desired to load new data into the WCS array which may be utilized to form 48 bit μ-words for use during normal WCS operation, then, in the example given above, data under the control of the TMS 204 would be retrieved from the D register 74 and transferred into the data buffer latch 205. It should be noted that in this instance, the preceding WTMS μ-words addressed in such a TMS microroutine would be utilized to retrieve the appropriate information from a storage location, for example, in the external memory unit 16. Specifically, the data would be fetched from an addressable storage location in the memory 16 and transmitted via the data bus 20 and the Din bus 22 into the MD register in the C scratch pad register 64 located within the data path unit 30. Subsequently, this data would be coupled to the D register 74 thru the ALU 66 for transmission via the Dout bus 24 to the data buffer latch 205. In this manner, aditional data can be retrieved from the external memory 16 or other storage devices such as peripheral unit 18 for loading in the WCS array 200.

As previously explained, the data conductors in the Dout bus and the Din bus 24 and 22 respectively, will typically transmit 16 bits of data at a time. To completely load a 48-bit μ-word in the WCS array 200, then, requires 3 separate transmissions of data.

The contents of the address register 208 are coupled through the address multiplexor 212 to the address input of the WCS array 200 each time the third bit position of a CTMS μ-word has the value of binary 1. The address register 208, which is also a counter, will have its contents advanced by a value of binary 1 each time a μ-word addressed in the CTMS store has a value of binary one in the second bit position. In the preferred embodiment of the present invention, only the least significant 10 bits of the 12 bits of data in the address register are coupled to the address multiplexor 212 which is sufficient to access any one of the 1,024 locations in the WCS array 200.

For the purpose of addressing only one of the three 16-bit storage locations (in the three 1024×16 bit RAMs comprising the WCS array 200) in a 48-bit storage location an additional addressing mechanism is included. More particularly, the two most significant bits of the 12 address bits stored in the address register 208 are coupled directly to the WCS array 200 to specify which of the three columns of 1024×16 bit RAMs will be addressed. Initially, the value of these two bits are obtained from the starting address transferred to the address register 208 from the D register 74 in the processor control unit 32 at the beginning of a TMS microroutine as explained above. If, then, for example, the values of the two most significant bits in the address register are 00 the first such column of RAM memory will be addressed; if the value of these bits is 01, the second column of RAM memory will be addressed; and if the value of these bits is 10 the third column of RAM memory will be addressed. The WCS array 200 contains logic circuitry (not shown) which will enable the proper one of three columns of RAM memory so that the 16-bit storage location therein specified by the address at the address input to the WCS array 200 is accessed. Additionally, this logic circuitry is arranged so that when the WCS unit 33 is operating in a normal WCS mode wherein 48-bit $\mu$-words are addressed in the WCS array 200 for controlling the operation of the processor 12, the address at the address input of the WCS array 200 will be directed to all three columns of RAM memory. In this event, the two most significant bits in the address register 208 are loaded with values of binary 1. Therefore, by updating the address stored within the address register 208, a stream of data can be loaded into the WCS array 200.

Still referring to FIG. 5, the output of the data buffer latch 205 is also coupled to a parity generator circuit 230 which will generate a parity bit to be written or loaded in the parity bit location with each 16 bits of data being loaded from the data buffer latch 205 into the SCS array 200. The output of the parity generator 230 is also coupled to a bit location in a status register 232 which is utilized to track parity information and other status information utilized by the processor 12 to monitor its operation. Similarly, each time a 48-bit $\mu$-word (or 16 bits of data in the local store mode) are retrieved from WCS array, it is coupled to a parity checker circuit 234 which will generate a parity error bit when the parity of the contents of the 16 storage bit storage locations in a column of RAM memory as generated by the parity checker circuit 234 does not match the binary value in the parity bit retrieved therewith. The output from the parity checker circuit 234 is similarly coupled to the status register 232 for use by the processor 12.

The portion of the WCS array 200 reserved for local store may be utilized to store information which may be retrieved by the processor 12 for later use. Specifically, the WTMS store 216 may be loaded with microroutine in which (i) a single 16-bit word of data or a block of such words are loaded into locations in the WCS array 200, or (ii) a single 16-bit word of data or a block of such words are retrieved from the local store section of the WCS array 200 and transferred through the Din multiplexor 214 to the data path 30 via the Din bus 22, or (iii) an exchange of 16 bit words of data takes place, that is, words of data are stored or written into the WCS array 200 and also retrieved therefrom. Typically, an exchange TMS microroutine would be used to, for example, move the contents of a block of registers in the A and B scratch pads 60 and 62 in the data path unit 30 to the local store section of the WCS array 200 and reload such registers with data from the local store section of the array.

In the preferred embodiment of the present invention, if data is to be retrieved from the WCS array 200 and transmitted via the Din bus 22 to the data path unit 30, the initial u-word retrieved from the TMS residence section of the WCS array and stored in the UCON register 42 will specify a bus transfer over the Din bus 22 by loading into a bit location in the UCON register 42 used to specify such transfers, a value of a binary one. The contents of this bit location along with the WCS select bit in the UCON register 42 which must always have a value of binary one whenever the WCS is to be controlled by the TMS 204, are both coupled to the inputs of an enabling gate 240 which will enable the Din multiplexor 214 to couple the contents of one of its inputs to the Din bus 22. As shown in FIG. 5, the Din multiplexor 214 may select between one and four data fields to be coupled onto the data lines of the Din bus 22. Specifically, these include the output from the status register 232 and three, 16 bit outputs from the columns of 1024×16 bit RAM memory comprising the WCS array 200.

In the preferred embodiment of the present invention, selection of the status register for connection to the Din bus 22 requires an additional bit to be loaded in to the UCON register 42. Selection between the data outputs of the three columns of 1024×16 bit memories for coupling to the Din bus 22 again makes use of the two most significant bits of the address register 208 in the same manner as described above for loading operations into the WCS array 200. Data at the selected input of the Din multiplexor 214 will be continuously coupled onto the Din bus 22 while the Din multiplexor 214 is enabled and the $\mu$-words retrieved from the WTMS store 216 will at the appropriate times specify a loading operation into the MD register of the C scratch pad 64 in the data path unit 30 to complete a transfer from the WCS unit 33 to the data path unit 30.

If, then, for example, the TMS microroutine being executed specifies the re-loading of a block of registers in the A and B scratchpad registers 60 and 62, a pipelining of data would take place in the following manner. After transferring control to the TMS 204 in the manner described above, a WTMS $\mu$-word will cause the contents of the address in the WCS array 200 specified at the address input thereto to be coupled to the output of the WSC array, as determined by the two most significant bits in the address register 208, will be coupled through the Din multiplexor 214, onto the Din bus 22 and stored in the MD register in the C scratchpad register 64. Also, the contents of both the address register 208 and the TMS pointer register 206 would both be incremented by a value of 1 when the P4 clock pulse is raised in the $\mu$-cycle. Thereafter, the next WTMS $\mu$-word addressed in the WTMS store 216 would similarly cause the contents of the next 16-bit storage location in the WCS array 200 to be coupled through the Din multiplexor 214, onto the Din bus 22 and stored in the MD register. Coincidentially, (i.e., in the same $\mu$-cycle) with the transfer of the second 16-bit word of data to the MD register and under the control of the second WTMS $\mu$-word mentioned above, the first 16-bit data word residing in the MD register at the start of the second such $\mu$-cycle would be coupled through the ALU 66, the D register 74 and into one of the storage registers in the A and B scratchpad registers 60 and 62. Thus, a pipelining action takes place whereby in each operation in which a data word is transferred into the MD register, the contents of the MD register at the start of such $\mu$-cycle are coupled during such $\mu$-cycle through the data path unit 30 to the appropriate register in the A and B scratchpad register 60 and 62.

In the preferred embodiment of the present invention, selection of an input to the Din bus 22 through the Din multiplexor 214 is determined by the contents of the two most significant bits in the address register 203 in the same manner specified above for loading data into the WCS array 200. However, in this case, when the values of the two most significant bits in the address register 208 are 11, the contents of the status register 232 are selected for coupling through the Din multiplexor 214. Data at the selected input of the Din multiplexor 214 will be continuously coupled onto the Din bus 22 while the Din multiplexor 214 is enabled and the $\mu$-words accessed in the WTMS store 216 will, at the appropriate times, specify a loading operation into the MD register of the C scratch pad register 64 to complete a transfer from the WCS unit 33 to the datapath unit 30.

After completion of the execution of a TMS microroutine, control of the processor 12 is returned to a microroutine in the WCS array 200. In particular, as earlier noted, a return address (more specifically, the low order nine bits of a control store address) was stored in the UPF latch 222 at the beginning of the TMS microroutine. Each time a $\mu$-word is accessed in the WTMS store 216, the contents of the UPF latch are added thereto for coupling to the microbus register 38. This portion of the contents in the microbus register 38 is coupled through the address and branching circuit 44 in the processor control unit 32 to the NUA bus 36 where it is combined with the output of the page register to form an address for the next 48-bit control word to be addressed by the processor 12. During the execution of the TMS microroutine, the presence of this address on the NUA bus 36 has no effect, except for enabling the microbus multiplexor 202 as earlier described, since the outputs from the WTMS store 216 and the address register 208 will constantly be selected for coupling through the microbus multiplexor 202 and the address multiplexor 212 respectively (since, during the execution of the TMS microroutine, the third bit position in each $\mu$-word accessed from the CTMS store 218 will have a value of binary 1).

At the conclusion of the TMS microroutine, the last $\mu$-word addressed in the CTMS store 218 will have a value of binary 0 in the third bit position. When the P3 clock pulse is raised during this $\mu$-cycle, the select signals to the microbus multiplexor 202 and the address multiplexor 212 will revert to their normal states whereupon the address on the NUA bus 36 will be coupled through the address multiplexor 212 to the WCS array 200. When the P1 clock pulse is raised in the subsequent $\mu$-cycle, control will be restored to the WCS array 200.

As can be appreciated from the foregoing description, utilization of a secondary control store facility of the present invention provides an economical and high performance means of laoding the WCS array with data and utilizing the WCS array for additional functions such as described above. It should be pointed out that the particular configuration described in FIG. 5 for incorporating the present invention is merely one of many different configurations that might be used to incorporate the present invention in a data processing system. Also, it is possible to utilize the present invention in conjunction with the primary control store of a processing unit such as control store 321 which makes use of a random access memory and which may be loaded at anytime with data to form new $\mu$-words for controlling the operation of the processor. In such cases, for example, a section may be reserved in the internal or external memory unit or in the control store itself for storing words which could be used to point to the starting addresses in the secondary control store facility for a particular function. Similarly, the present invention, as generally described herein, may be used in a data processing system where block transfers are required which do not require the use of $\mu$-words as long as the $\mu$-words normally used to control the operation the the processor.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In a data processing system including at least one data storage unit for storing operating routine instructions and data and a processor for processing such operating routine instructions and data received from said data storage unit, said processor comprising:

A. primary control store means having an output, an address input and a data input and having a plurality of addressable storage locations for storing processor instructions, pluralities of said processor instructions being grouped together to form programs utilized to control the processor during the execution of said operating routine instructions received by the processor from the data storage unit;

B. first addressing means coupled to the address input of said primary control store means for addressing certain ones of said addressable storage locations and causing the processor instructions contained in said addressed storage locations to be coupled to the output of said primary control store means;

C. instruction transmission means coupled to the output of said primary control store means for transmitting processor instructions at the output of said primary control store means throughout said processor for controlling the operation thereof;

D. secondary control store means having an output coupled to said instruction transmission means and an address input and having a plurality of addressable storage locations therein for storing processor instructions, pluralities of said processor instructions being grouped together to form programs utilized to control the operation of said processor;

E. second addressing means coupled to the address input of said secondary control store means for addressing certain ones of the addressable storage locations in said secondary control store means and causing contents of said addressed storage locations to be coupled to the output of said secondary control store means;

F. data means responsive to the output of said secondary control store means having an input for receiving data from said processor and an output coupled to the data input of said primary control store means for transferring data to said primary control store means;

G. third addressing means responsive to the output of said secondary control store means and coupled to said first addressing means, for controlling the addressing of said primary control store means in response to the output of said secondary control store means; and H. enabling means, having an output coupled to said second addressing means and responsive to an output from said primary control store means for enabling said second addressing means to address certain ones of said addressable storage locations in said secondary control store means;

whereby processor instructions stored in said secondary control store means may be used to control the processor when data is transferred to and from said primary control store means.

2. The apparatus as described in claim 1 further including first selection means responsive to the output of said secondary control store means and having an output coupled to said instruction transmission means, a first input coupled to the output of said primary control store means and a second input coupled to the output of said secondary control store means, for selecting between the outputs of said primary control store means and said secondary control store means for coupling processor instructions to said instruction transmission means.

3. The apparatus as described in claim 2, wherein said processor includes at least one data bus for transmitting data throughout said processor and wherein said data means is comprised of a storage means having an input coupled to said data bus for transferring data received from said data bus to said primary control store means in response to the output of said secondary control store means.

4. The apparatus as described in claim 3 further including a second selection means having an input coupled to the output of said primary control store means and an output coupled to said data bus and responsive to the output of said secondary control store means for transferring the output of said primary control store means to said processor data bus.

5. The apparatus as described in claim 4 wherein said third addressing means is comprised of a counter storage register having a first input coupled to said data means and a counter input coupled to the output of said secondary control store means whereby an address may be loaded from said data means into said third addressing means and the contents thereof may be incremented in response to an output from the secondary control store means.

6. The apparatus as described in claim 5 wherein said second addressing means is comprised of a counter storage register having a counter input coupled to the output of said secondary control store means whereby the contents therein may be incremented in response to the output of the secondary control store means.

7. The apparatus as described in claim 6 wherein said enabling means is comprised of a storage register having an input coupled to said instruction transmission means and an output coupled to said second addressing means for storing a portion of the contents of a processor instruction coupled to the output of said primary control store means said portion including in address of one of said addressable storage locations and said secondary control store means for transferring said portion including said address to said second addressing means.

8. The apparatus as described in claim 2 further including a return address means having an input coupled to the output of said first selection means and an output coupled to said third addressing means and responsive to the output of said secondary control store means an storing therein for address for addressing one of said addressable storage locations in said primary control store means after completion of a transfer of data to or from said primary control store means controlled by processor instructions in said secondary control store means.

9. The apparatus as described in claim 1 wherein said primary control store means is comprised of a random access memory having a plurality of addressable storage locations which may be read from and written into.

10. The apparatus as described in claim 1 wherein said secondary control store means is comprised of a read only memory having a pre-programmed processor instruction stored in each of said addressable storage locations.

11. The apparatus as described in claim 7 wherein said secondary control store means is comprised of:

A. a first read-only memory having input coupled to said second addressing means and an output coupled to said first selection means; and B. a second read-only memory having input coupled to said second addressing means and an output coupled to said data means, an output coupled to the counter input of said second addressing means, an ouput coupled to the counter input of said third addressing means and an output coupled to said first and second selection means;

12. In a data processing system including at least one data storage unit for storing operating routines and data, a processor unit for processing said operating routines and data stored in said data storage unit, and wherein said processor unit includes at least one data transmission means for transmitting data throughout the processor unit and a first procesor control means having a plurality of addressable storage locations for storing processor instructions therein used to control the processor unit during the processing of said operating routines and data, instruction transmission means coupled to the output of said first processor control means for coupling said instructions throughout said processor, and a first addressing means for addressing certain ones of said addressable storage locations in the first processor control means, said data processing system further including a second control means coupled to said processor unit for controlling the operation thereof at certain times, said second processor control means comprising:

A. a first control store means having an output, a data input and an address input and having a plurality of addressable storage locations for storing processing instruction, pluralities of said processor instructions being grouped together to form programs utilized for controlling the operating of said processor unit;

B. first address means coupled to the address input of said first control store means for addressing certain ones of said addressable storage locations whereby the processor instructions stored in the addressed storage locations are coupled to the output of said first control store means;

C. second control store means having an output and an address input and having a plurality of addressable storage locations for storing processor instructions, pluralities of said processor instructions being grouped together to form programs utilized to control the operation of the processor;

D. second address means coupled to the address input of said second control store means for addressing certain ones of said addressable storage locations whereby the processor instructions stored in the addressed storage locations are coupled to the output of said second control store means;

E. data means responsive to the output of said second control store means and having an input coupled to the data transmission means and an output coupled to the data input of said first control store means for transferring data to said first control store means;

F. third addressing means responsive to the output of said second control store means and having an output coupled to said first addressing means for controlling the addressing of said first control store means in response to the output of said second control store means;

G. first selection means responsive to the output of said second control store means and having an output coupled to said instruction transmission means, a first input coupled to the output of said first control store means and a second input coupled to the output of said second control store means for selecting between the outputs of said first and second control store means for coupling to said instruction transmission means;

H. second selection means responsive to the output of said second control store means and having an input coupled to the output of said first control store means and an output coupled to said data transmission means for coupling the output of the first control store means to the data transmission means in response to the output of said second control store means; and I. enabling means responsive to the output of said first control store means and having an input coupled to said second addressing means for enabling said second addressing means to address certain ones of said addressable storage locations in said second control store means;

whereby the processor instructions in said second control store means may be used to control the processor unit when data is transferred to and from said first control store means.

13. The apparatus as described in claim 12 wherein:

A. said third addressing means is comprised of a counter storage register having an input coupled to said data means and a counter input coupled to the output of said second control store means whereby an address may be loaded into said third addressing means from said data means and incremented in response to the output of said second control store means; and B. said second addressing means is comprised of a counter storage register having an input coupled to the enabling means and a counter input coupled to the output of said second control store means whereby an address can be loaded from said enabling means to said second addressing means and incremented in response to the output of said second control store means.

14. The apparatus as described in claim 13 further including a return address means responsive to the output of said second control store means and coupled to the output of said first selection means for storing an address for addressing one of said addressable storage locations in said first control store means after completion of a transfer of data to and from said first control store means controlled by processor instructions in said second control store means.

15. The apparatus as described in claim 12 wherein said first control store means is comprised of a random access memory having an output, a data input and an address input and wherein said second control store means is comprised of a read-only memory having a pre-programmed processor instruction stored in each of the addressable storage location therein.

* * * * *